United States Patent
McKenzie et al.

(10) Patent No.: US 6,222,336 B1
(45) Date of Patent: Apr. 24, 2001

(54) ROTATIONAL VIBRATION DETECTION USING SPINDLE MOTOR VELOCITY SENSE COILS

(75) Inventors: Lealon R. McKenzie; D. Brent Douglas, both of Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/302,586

(22) Filed: Apr. 30, 1999

Related U.S. Application Data

(60) Provisional application No. 60/088,077, filed on Jun. 5, 1998.

(51) Int. Cl.$^7$ ................................................ G11B 19/20
(52) U.S. Cl. ........................ 318/448; 318/611; 369/239
(58) Field of Search .................... 318/448, 460, 318/126, 127, 128, 611, 623, 621; 369/43, 44.35, 44.36, 239

(56) References Cited

U.S. PATENT DOCUMENTS

| | | |
|---|---|---|
| 4,040,103 | 8/1977 | While . |
| 4,297,734 | 10/1981 | Laishley et al. . |
| 4,692,915 | 9/1987 | Moriya et al. . |
| 4,914,644 | 4/1990 | Chen et al. . |
| 4,947,093 | 8/1990 | Dunstan et al. . |
| 4,967,293 * | 10/1990 | Aruga et al. ................ 360/78.12 |
| 5,036,506 | 7/1991 | Bierhoff . |
| 5,235,472 | 8/1993 | Smith . |
| 5,251,484 | 10/1993 | Mastache . |
| 5,254,920 | 10/1993 | Agarwal et al. . |
| 5,299,075 | 3/1994 | Hanks . |
| 5,426,545 | 6/1995 | Sidman et al. . |
| 5,452,612 | 9/1995 | Smith et al. . |
| 5,453,972 * | 9/1995 | Kanazawa et al. ............ 369/219 |
| 5,521,772 * | 5/1996 | Lee et al. ...................... 360/75 |
| 5,636,193 * | 6/1997 | Ohmi ............................ 369/53 |
| 5,654,840 | 8/1997 | Patton et al. . |
| 5,880,587 * | 3/1999 | Annis et al. ................... 324/212 |
| 5,936,787 * | 8/1999 | Ohmi ............................ 360/73.03 |

FOREIGN PATENT DOCUMENTS

| | | |
|---|---|---|
| 0264 535 A2 | 4/1988 | (EP) . |
| 0 306 715 A1 | 3/1989 | (EP) . |
| 0 658 894 A1 | 6/1995 | (EP) . |
| 0675 365 A2 | 10/1995 | (EP) . |
| 2 011 654 | 7/1979 | (GB) . |

OTHER PUBLICATIONS

White and Tomizuka, "Increased Disturbance Rejection in Magnetic Disk Drives by Acceleration Feedforward Control," Department of Mechanical Engineering, University of California, Berkeley, CA 94720–1740, 13$^{th}$ Triennial World-Congress, San Francisco, USA, 1996.

Abramovitch, "Rejecting Rotational Disturbances on Small Disk Drives Using Rotational Accelerometers," Storage Technologies Department, Hewlett–Packard Laboratories, Alto, CA 94304–1126, 13$^{th}$ Triennial World Congress, San Francisco, USA, 1996.

\* cited by examiner

*Primary Examiner*—Bentsu Ro
(74) *Attorney, Agent, or Firm*—Crowe & Dunlevy

(57) ABSTRACT

An apparatus and method for detecting rotational vibration applied to a disc drive having an actuator supporting a head adjacent a rotatable disc. A spindle motor has a set of driver coils which rotate the disc through electrical commutation, and a set of velocity sense coils which sense the rotational velocity of the motor in relation to voltages established across the sense coils. Rotational vibration is detected in relation to changes in the rotational velocity of the disc. A data transfer operation between the disc and a host device is interrupted when the magnitude of the rotational vibration exceeds an acceptable level. A servo circuit compensates for the application of rotational vibration to the disc drive by adjusting current applied to the actuator in relation to the changes in the rotational velocity of the disc.

14 Claims, 7 Drawing Sheets

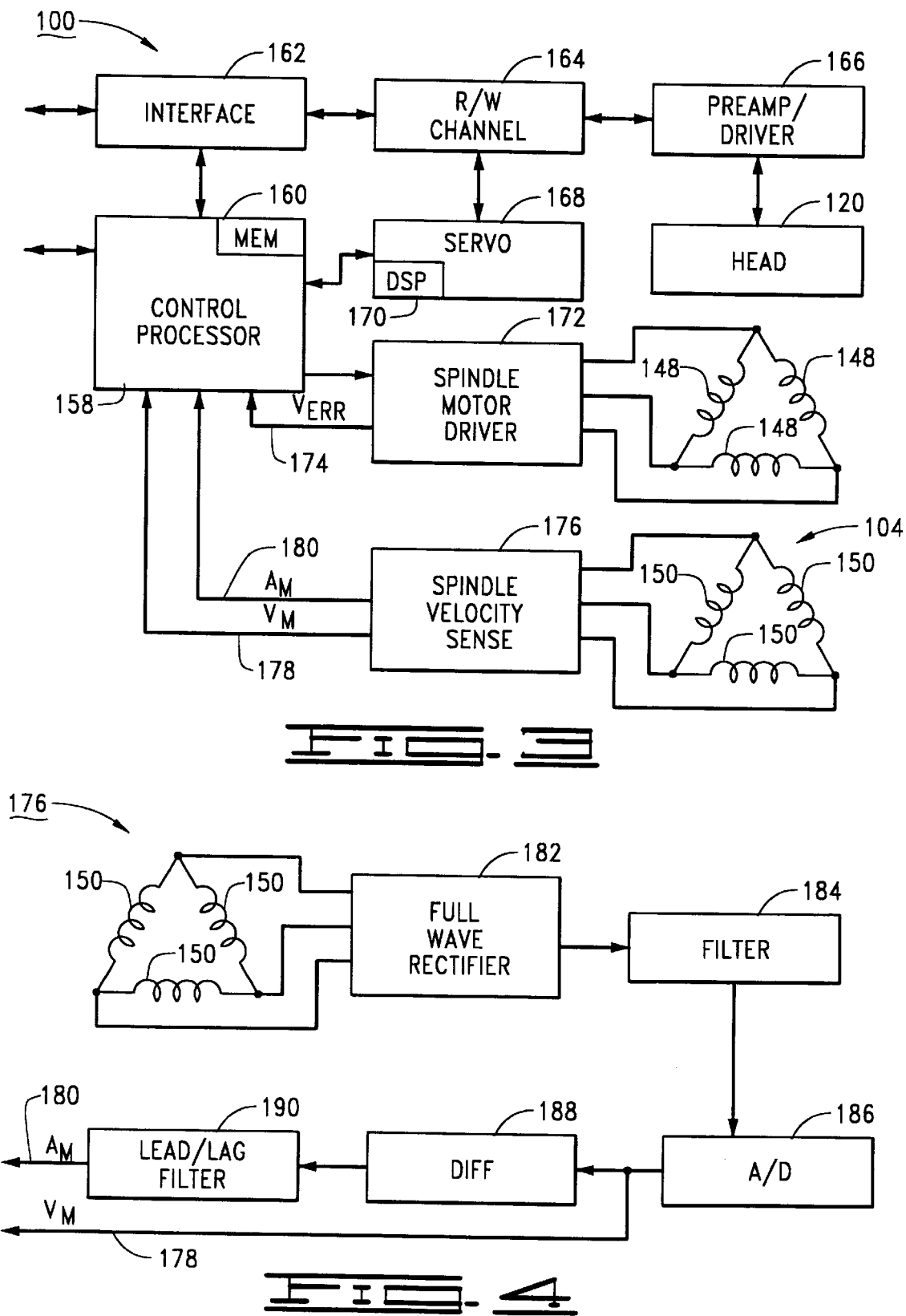

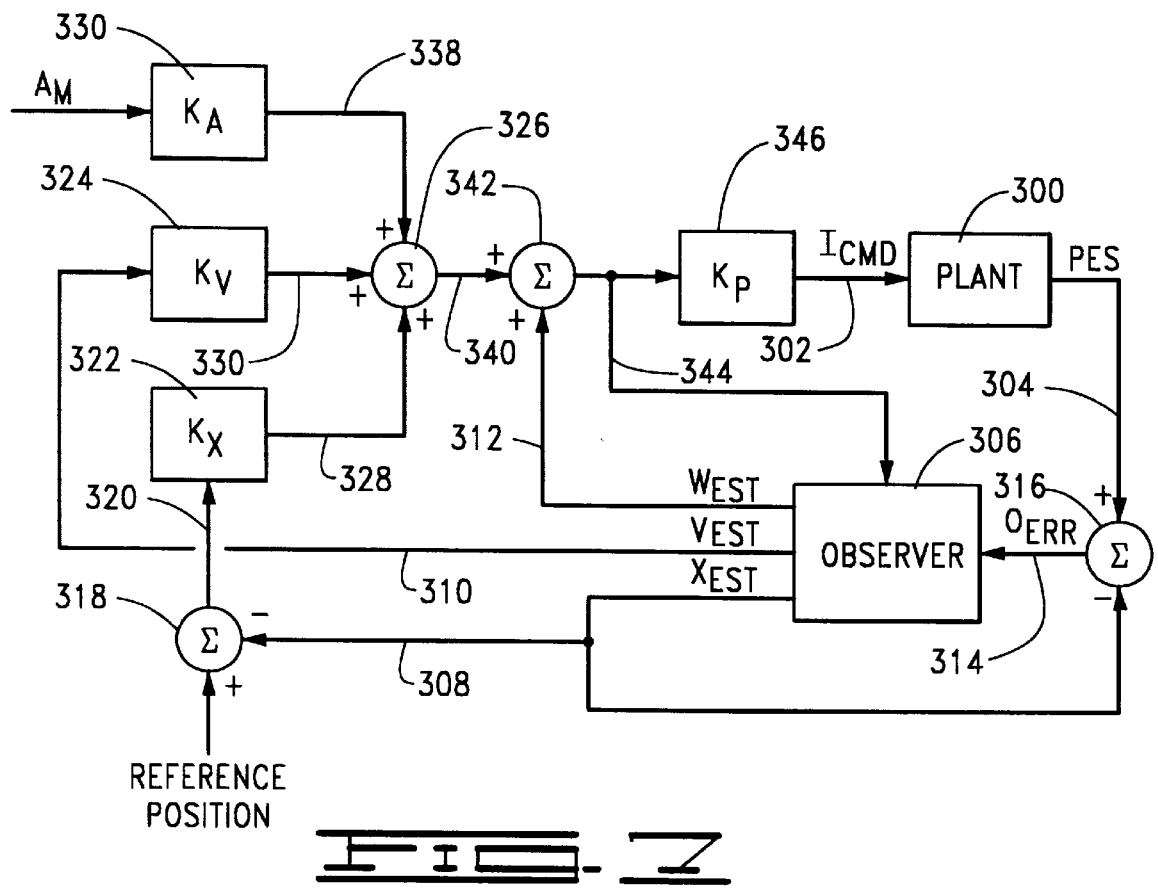
_FIG. 7_
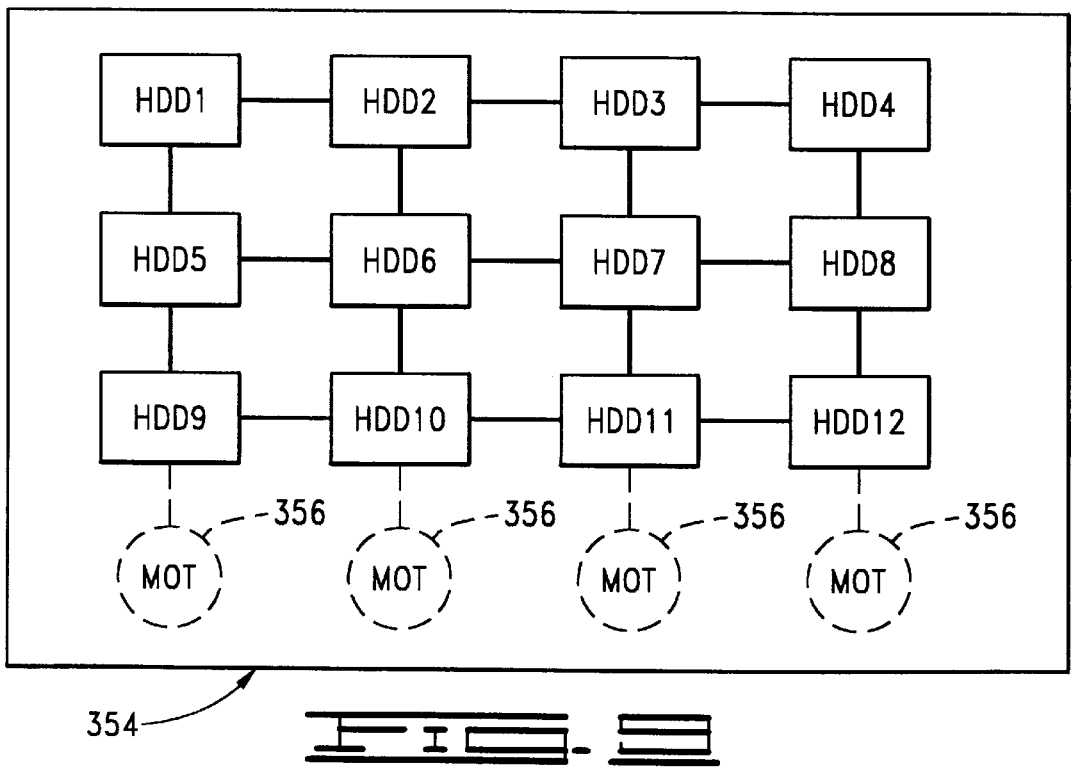
_FIG. 9_

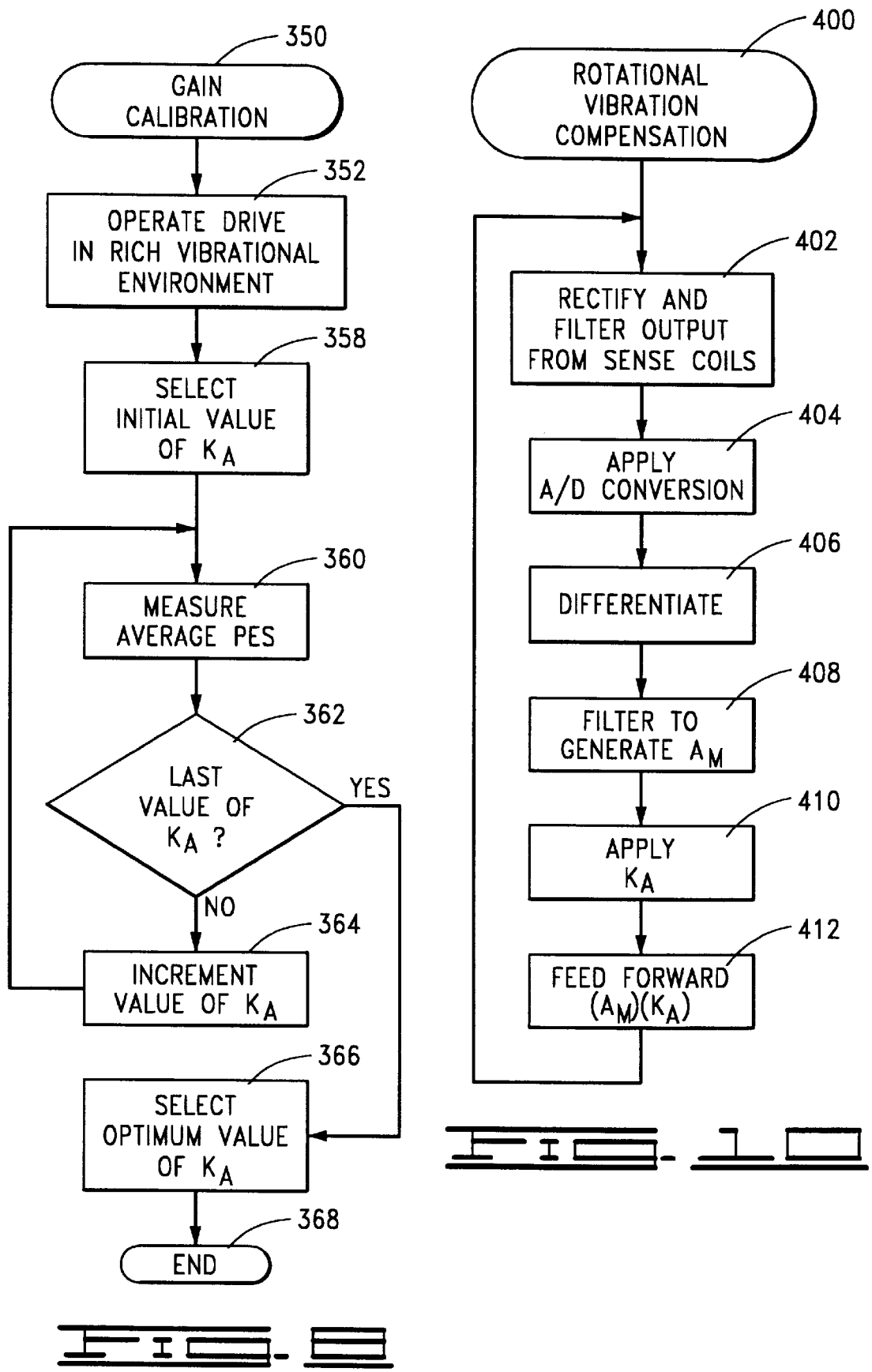

ROTATIONAL VIBRATION DETECTION USING SPINDLE MOTOR VELOCITY SENSE COILS

RELATED APPLICATIONS

This application claims the benefit of United States Provisional Application No. 60/088,077, filed Jun. 5, 1998.

FIELD OF THE INVENTION

This invention relates generally to the field of disc drive storage devices, and more particularly, but not by way of limitation, to improving data transfer performance of a disc drive by using velocity sense coils in a disc drive spindle motor to detect and compensate for the application of rotational vibration to the disc drive.

BACKGROUND OF THE INVENTION

Disc drives are digital data storage devices which enable users of computer systems to store and retrieve large amounts of data in a fast and efficient manner. Disc drives of the present generation have data storage capacities in excess of several gigabytes (GB) and can transfer data at sustained rates of several megabytes (MB) per second.

A typical disc drive is provided with a plurality of magnetic recording discs which are mounted to a rotatable hub of a spindle motor for rotation at a constant, high speed. An array of read/write heads are disposed adjacent surfaces of the discs to transfer data between the discs and a host computer. The heads are radially positioned over the discs by a closed loop, digital servo system, and are caused to fly proximate the surfaces of the discs upon air bearings established by air currents set up by the high speed rotation of the discs. A plurality of nominally concentric tracks are defined on each disc surface to accommodate the storage of user data.

A preamplifier/driver circuit (preamp) generates write currents that are used by the head to selectively magnetize the tracks during a data write operation. The preamp further amplifies read signals detected by the head during a data read operation. A read/write channel and interface circuit are operably connected to the preamp to transfer the data between the discs and the host computer.

A rigid housing is provided to support the spindle motor and the actuator and to form an internal controlled environment to minimize particulate contamination of the discs and heads. A printed circuit board is mounted to the exterior of the housing to accommodate the disc drive control electronics (including the aforementioned servo circuit, read/write channel and interface circuit).

Disc drives are often used in a stand-alone fashion, such as in a typical personal computer (PC) or portable data processing/communication device where a single disc drive is utilized as the primary data storage peripheral. However, in applications requiring vast amounts of data storage capacity or high input/output (I/O) bandwidth, a plurality of drives can be arranged into a multi-drive array, sometimes referred to as a RAID ("Redundant Array of Inexpensive Discs"; also "Redundant Array of Independent Discs"). A seminal article proposing various RAID architectures was published in 1987 by Patterson et al., entitled "A Case for Redundant Arrays of Inexpensive Discs (RAID)", Report No. UCB/CSD 87/391, December 1987, Computer Science Division (EECS), University of California, Berkeley, Calif.

Since their introduction, RAIDs have found widespread use in a variety of applications requiring significant data transfer and storage capacities. It is presently common to incorporate several tens, if not hundreds, of drives into a single RAID. While advantageously facilitating generation of large scale data storage systems, however, the coupling of multiple drives within the same enclosure can also set up undesirable vibrations from excitation sources within the drives, such as spindle motors used to rotate the discs and actuators used to move the heads to various tracks on the discs. Such vibrations can be transmitted from drive to drive through chassis mounts used to secure the drives within the enclosure.

Vibrational components can be characterized as translational, or rotational in nature. Translational vibrations tend to move a disc drive housing back and forth along a plane of the drive, whereas rotational vibrations tend to rotate a disc drive housing about an axis normal to a plane of the drive. Because attempts are made to provide nominally balanced actuators, translational vibrations will generally have little effect upon the ability of the actuator to maintain the heads at a selected position with respect to the discs, as the discs and the actuator will both respond to the movement induced by such translational vibrations.

However, such is not usually true with rotational vibrations. Even with a nominally balanced actuator, rotational vibrations will tend to move the discs relative to the actuator because the actuator, acting as a free body, remains essentially undisturbed due to inertial effects while the discs, mounted to the housing, are displaced by imparted rotational vibration. When sufficiently severe, such movement will cause an "off-track" condition whereby a head is moved away from a selected track being followed. Such off-track conditions can adversely affect the ability of the drive to transfer data between the discs and host device.

The problems associated with rotational vibrations are well known in the disc drive art. Compensation attempts have included use of sensors that can detect the presence of rotational vibration in a disc drive, such as discussed in U.S. Pat. No. 5,235,472 issued Aug. 10, 1993 to Smith, assigned to the assignee of the present invention. Efforts to both detect and compensate rotational vibration using feedforward control include discussions by White and Tomizuka, "Increased Disturbance Rejection in Magnetic Disk Drives by Acceleration Feedforward Control," and Abramovitch, "Rejecting Rotational Disturbances on Small Disk Drives Using Rotational Accelerometers." Both of these papers were presented at the $13^{th}$ Triennial World Congress, San Francisco, U.S.A., 1996.

While operative, there are limitations with these and other prior art approaches to minimizing the effects of rotational vibration in a disc drive. Sensors that specifically detect rotational vibration are commercially available, but are often prohibitively expensive for use in low cost disc drive designs and are also often difficult to properly calibrate for a particular drive application. Such sensors may include a piezoelectric polymer film disposed between metallic layers that detects rotational vibration in response to torsion induced on the film, as disclosed by the aforementioned Smith U.S. Pat. No. 5,235,472 patent; another construction uses multiple piezoelectric transducers within a single component enclosure to detect rotation in relation to differences in detected motion among the transducers.

Alternatively, rotational sensors can be formed from two or more discrete linear accelerometers which detect rotational vibration in response to differences in the detected motion between the devices. While potentially less expensive to implement than an integrated rotational sensor, commercially available discrete linear accelerometers (piezo or similar construction) can have significant part-topart output gain variation characteristics, making such unsuitable for use in a drive to detect rotational vibration without special screening and trimming operations to obtain matched sets of accelerometers.

By way of example, the aforementioned White et al. and Abramovitch references are illustrative of conventional approaches requiring use of relatively precise (and therefore expensive) accelerometers, as well as a calibration routine requiring use of a shaker table to impart vibrations of known characteristics. Such considerations make these approaches undesirable for high volume disc drive manufacturing, and prevent future adaptation of the response characteristics of a given drive to its subsequent field environment.

These references are also limited to compensating for rotational effects and do not address translational effects. However, translational effects have also been found to contribute to off-track errors due to actuator imbalance. In practice, induced vibration is seldom purely rotational or translational, but rather usually includes a combination of both.

Accordingly, as disc drive track densities and performance requirements continue to increase, there remains a continual need for improved approaches in the art to compensating for the effects of vibration in a disc drive using inexpensive and easily configured vibration sensor circuitry.

SUMMARY OF THE INVENTION

The present invention provides an apparatus and method for detecting application of rotational vibration to a disc drive.

As exemplified by presently preferred embodiments, a disc drive spindle motor controllably rotates a data storage disc 106 using a set of driver coils which magnetically interact with a plurality of circumferentially extending driver magnets when electrical currents are applied to the driver coils. A separate set of sense coils is provided to output voltages indicative of rotational velocity of the disc to detect the application of rotational vibration to the disc drive. The sense coils preferably magnetically interact with the driver magnets, although separate sense magnets can be alternatively provided.

A spindle motor driver circuit applies the electrical currents to the set of driver coils and outputs a velocity error signal $V_{ERR}$ indicative of error in rotational velocity of the disc, with the spindle motor driver circuit adjusting the electrical currents in relation to the velocity error signal. A spindle velocity sense circuit generates a motor velocity signal $V_M$ indicative of the velocity of the spindle motor in response to the set of voltages output by the set of sense coils. A processor having associated programming detects the application of rotational vibration to the disc drive in relation to the velocity error signal $V_{ERR}$ and the motor velocity signal $V_M$.

The disc drive further preferably comprises an actuator supporting a head adjacent the disc, the actuator having a coil of an actuator motor. A servo circuit applies current to the coil to position the head relative to the disc, wherein the servo circuit compensates for the application of rotational vibration to the disc drive by adjusting the current applied to the coil in relation to the motor velocity signal.

These and various other features as well as advantages which characterize the present invention as claimed below will be apparent from a reading of the following detailed description and a review of the associated drawings.

BRIEF DESCRIPTION OF THE DRAWINGS

FIG. 4 provides a functional block diagram of the spindle velocity sense circuit of FIG. 3.

FIG. 6 provides a generalized flow chart for a DATA TRANSFER INTERRUPTION routine, representative of programming utilized by the DSP to temporarily interrupt a data transfer operation between the disc drive and a host device when a magnitude of rotational vibration exceeds a predetermined threshold.

FIG. 7 is a control diagram representative of programming utilized by a digital signal processor (DSP) of the servo circuit of FIG. 3.

FIG. 8 provides a generalized flow chart for a GAIN CALIBRATION routine, representative of steps carried out to set a gain of a gain block of the control diagram of FIG. 7.

FIG. 9 provides a representation of an operational environment rich in rotational and translational vibration, useful for the flow of FIG. 8.

FIG. 10 provides a generalized flow chart for a ROTATIONAL VIBRATION COMPENSATION routine, representative of steps carried out by the disc drive in compensating for the effects of applied rotational vibration.

DETAILED DESCRIPTION

The scope of the invention disclosed herein will be defined by the appended claims; however, in order to provide sufficient information to enable those skilled in the art to practice the claimed invention, various preferred embodiments thereof will now be discussed. It will be understood that many of the following features and aspects are provided merely for purposes of illustration and to describe environments in which the claimed invention can be advantageously practiced.

Figure 1:
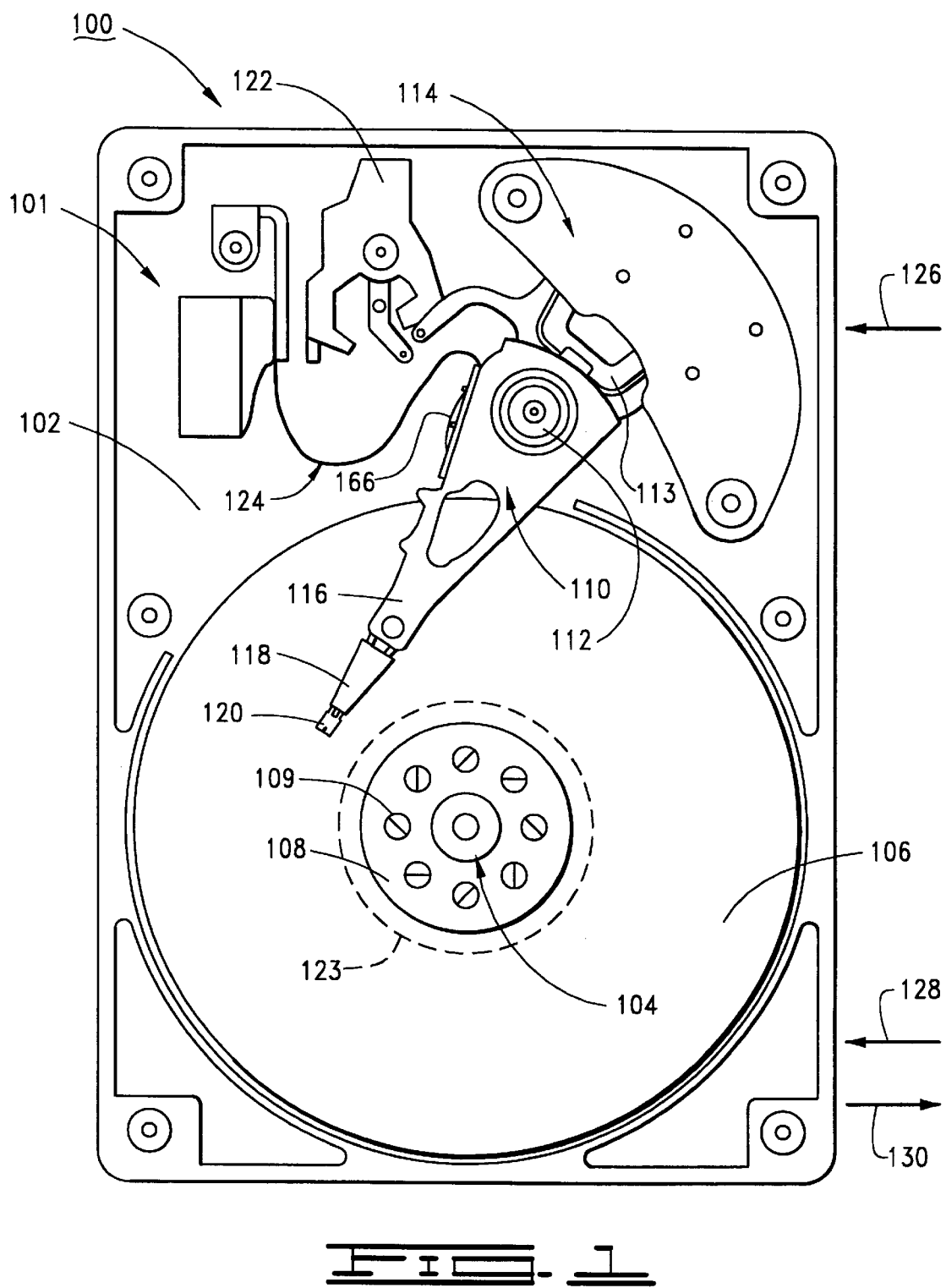
FIG. 1 provides a top plan view of a disc drive constructed in accordance with a preferred embodiment of the present invention.

Referring first to FIG. 1, shown therein is a top plan view of a disc drive 100 used to store computer data. The disc drive 100 includes a head-disc assembly (HDA) 101 and a printed wiring assembly (PWA) which is mounted to the underside of the HDA and is thus not visible in FIG. 1. The PWA includes electronics used to control the operation of the HDA 101, as discussed below.

A top cover, omitted from FIG. 1 to reveal interior portions of the HDA 101, mates with a base deck 102 of the HDA 101 to provide an environmentally controlled environment for the HDA 101. A spindle motor (generally designated at 104) is supported by the base deck 102 and rotates a plurality of discs 106 at a constant high speed. A disc clamp 108 secures the discs 106 to the spindle motor 104 using a number of fasteners 109.

The discs 106 include recording surfaces (not separately designated) to which user data are written by way of a rotary actuator 110, which rotates about a cartridge bearing assembly 112 in response to the application of current to an actuator coil 113 of a voice coil motor (VCM) 114. As will be recognized, the VCM includes a magnetic circuit (not separately designated) which establishes a magnetic field in which the actuator coil 113 is immersed. The passage of current through the actuator coil 113 sets up a magnetic field which interacts with the magnetic field of the magnetic circuit to rotate the actuator 110 about the cartridge bearing assembly 112.

A plurality of rigid arms 116 extend from the actuator 110, each of which supports a corresponding flexible suspension 118. A plurality of heads 120 are supported by the suspensions 118 over the recording surfaces of the discs 106 by air bearings established by air currents set up by the high speed rotation of the discs 106. The heads 120 are preferably characterized as magneto-resistive (MR) heads, each having a thin film inductive write element and an MR read element.

A latch 122 secures the actuator 110 when the disc drive 100 is deactivated, so that the heads 120 come to rest upon texturized landing zones 123 at a common inner radius of the discs 106. A flex circuit assembly 124 facilitates electrical interconnection between the actuator 110 and the disc drive PWA, and comprises a flexible, laminated plastic ribbon with embedded conductive paths to pass write and read signals to and from the head, as well as VCM drive currents to the coil 113.

To understand the operation of the disc drive 100 in accordance with preferred embodiments of the present invention, it will first be helpful to review the manner in which rotational vibration can adversely affect the operation of the disc drive 100. As mentioned above, vibrational effects can be characterized as translational, or rotational in nature. By way of example, translational vibration, illustrated by acceleration vectors 126 and 128 in FIG. 1, tends to move the base deck 102 laterally along a selected plane of the disc drive 100 (in this case, along a plane generally parallel to a plane of the top disc 106). Because the actuator 110 is nominally balanced about the cartridge bearing assembly 112, both the discs 106 and the heads 120 will tend to move together, resulting in minimal head/disc displacement.

On the other hand, rotational vibration, illustrated by acceleration vectors 126 and 130, causes movement of the base deck 102 about an axis normal to a plane along which the top disc 106 extends. The discs 106 accordingly move along with the base deck 102, but the actuator 110, as a free body, remains essentially stationary in space. The resulting displacement can adversely affect a data transfer operation between the selected head 120 and the corresponding disc 106; for example, should the displacement occur during a write operation, data intended to be written to a particular track on the disc 106 might be overwritten onto an adjacent track, irretrievably corrupting the user data stored on the disc 106. Such rotational vibration will also tend to change the rotational velocity of the spindle motor 104, which can be detected as discussed below.

Figure 2:
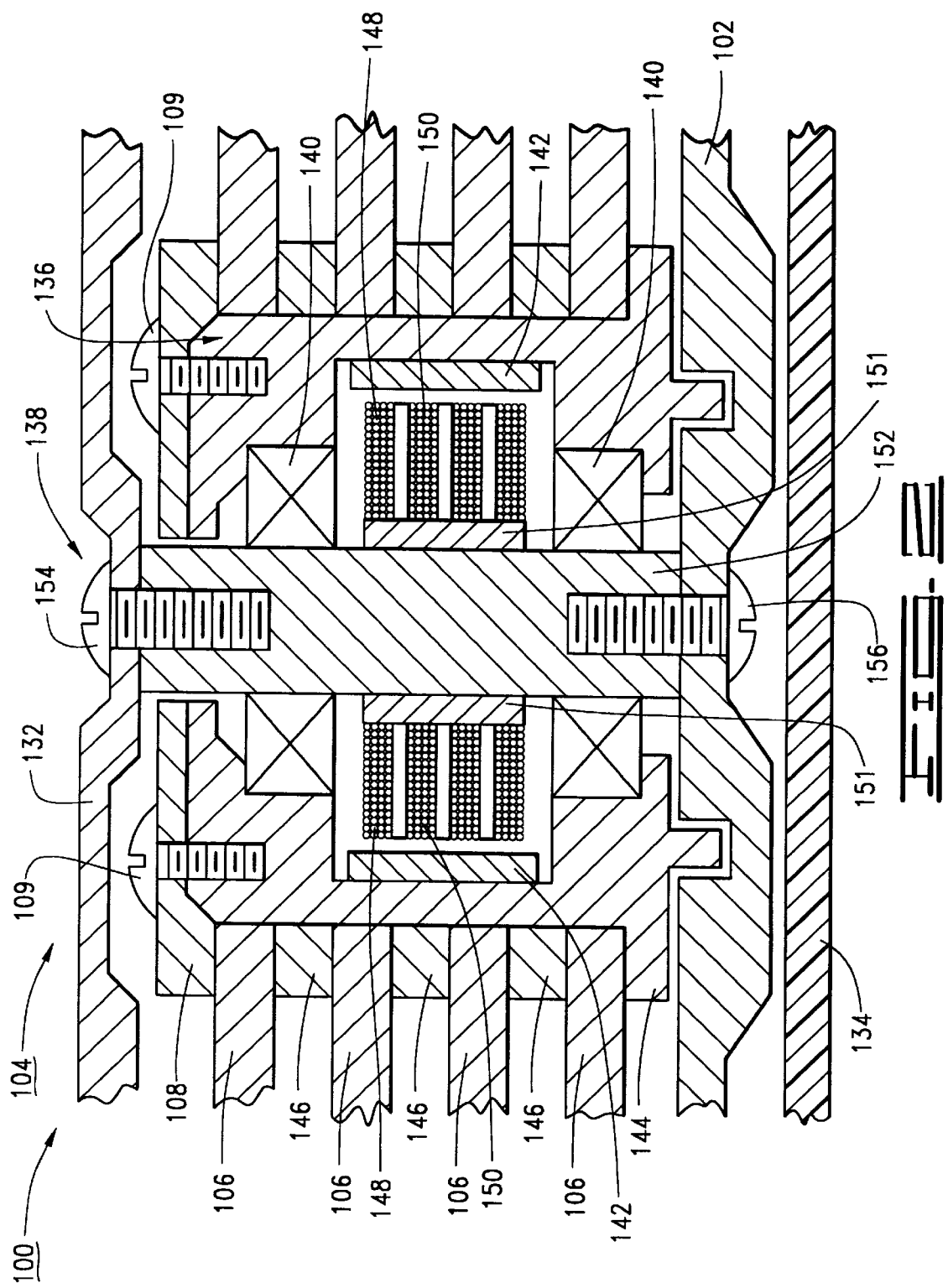
FIG. 2 provides an elevational, cross-sectional representation of the disc drive of FIG. 1, illustrating a preferred internal construction of the spindle motor used to rotate a plurality of discs and having a set of velocity sense coils.

FIG. 2 provides an elevational, cross-sectional view of the disc drive of FIG. 1, showing a preferred internal construction of the spindle motor 104. FIG. 2 includes the aforementioned top cover (which is designated at 132) and disc drive PWA (which is designated at 134).

The spindle motor 104 comprises a rotatable hub portion 136 which rotates about a stationary stator portion 138 by way of a pair of bearing assemblies 140. The hub portion 136 includes a plurality of permanent magnets 142 and a circumferentially extending flange 144. The discs 106 and a corresponding array of disc spacers 146 are clamped between the flange 144 and the disc clamp 108, as shown.

The permanent magnets 142 (also referred to as driver magnets") magnetically interact with a set of spindle motor driver coils 148 which, as discussed below, are electrically commutated to cause the hub portion 136, and hence the discs 106, to rotate at a nominally constant speed. The permanent magnets 142 further preferably magnetically interact with a set of spindle motor velocity sense coils 150 which provide a measure of rotational velocity of the spindle motor 104 in order to facilitate detection and compensation of rotational vibration applied to the disc drive 100. In a preferred embodiment, the driver coils 148 are wound about the velocity sense coils 150, as shown in FIG. 2, although other configurations are readily contemplated, such as placement of the velocity sense coils 150 about the driver coils 148, as well as placement of the velocity sense coils 150 apart from the driver coils 148 with a second set of permanent magnets (not shown, also referred to as "sense magnets") to interact with the velocity sense coils 150. The spindle motor 104 is preferably a three phase motor, so that there are a total of three driver coils 148 and three sense coils 150 wound about a total of 12 poles (two of which are represented at 151) arranged circumferentially about the stator portion 138.

The poles 151 are supported by a spindle motor shaft 152, the shaft defining a central axis about which the discs 106 rotate. The shaft 152 is affixed to the top cover 132 and the base deck 102 using fasteners 154 and 156, respectively.

Figure 3:
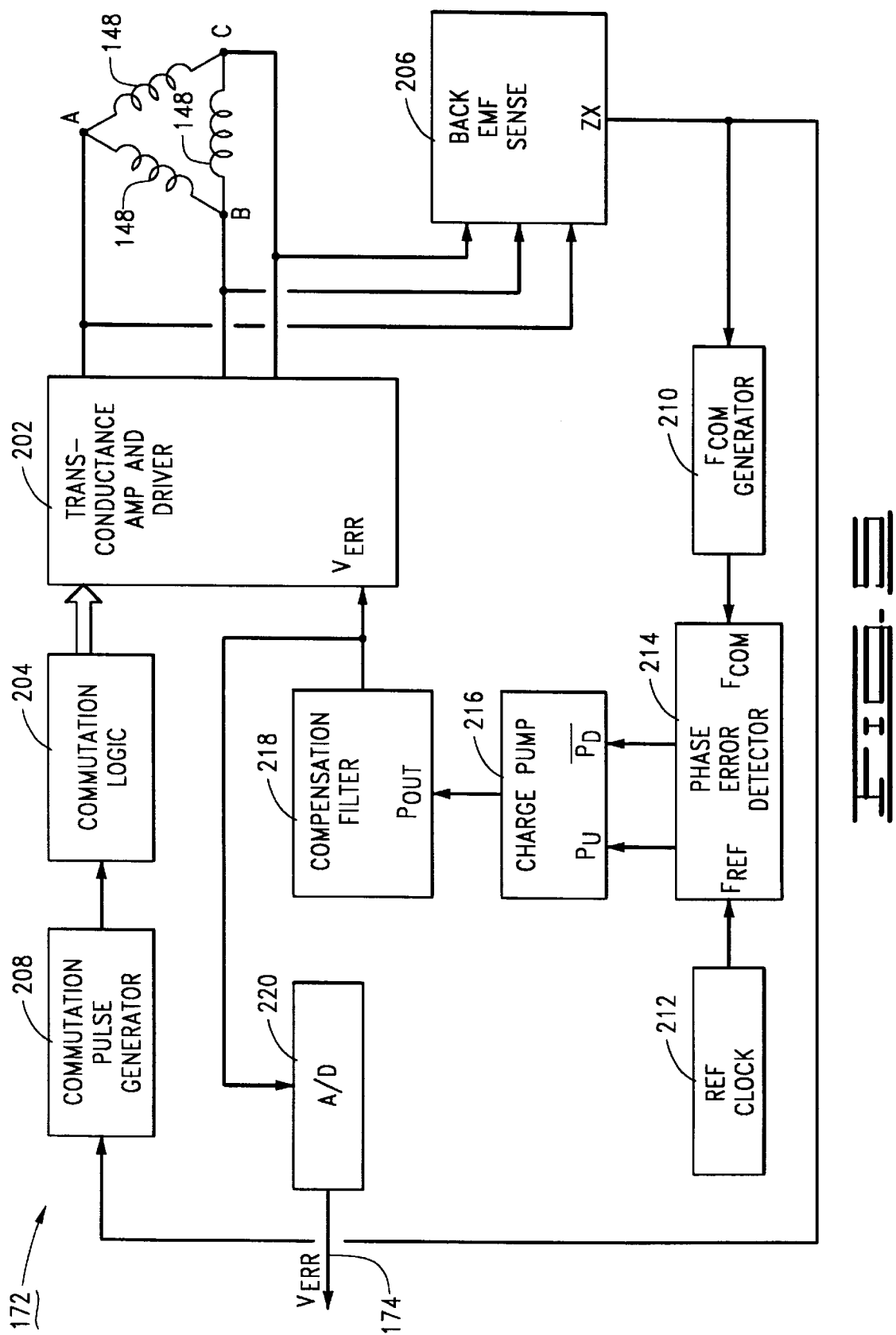
FIG. 3 provides a generalized functional block diagram of the disc drive of FIG. 1.

The general manner in which the velocity sense coils 150 are used to detect and compensate rotational vibration can be understood beginning with a review of FIG. 3, which provides a generalized functional block diagram of the control electronics disposed on the disc drive PWA 134 and used to control the operation of the disc drive 100. A control processor 158 directs overall operation of the disc drive 100 in accordance with programming stored in memory (MEM) 160. An interface circuit 162 controls the transfer of data between the discs 106 and a host computer (not shown) in which the disc drive 100 is mounted in a user environment.

During a data write operation, a read/write channel 164 encodes and serializes data to be written to disc and passes the same to a preamp/driver circuit 166 which applies a series of write currents to a write element of a selected head 120 to selectively magnetize the corresponding disc 106. During a data read operation, a read element of the head 120 transduces the selective magnetization of the disc 106 and outputs a read signal which is preamplified by the preamp/driver 166 and passed to the read/write channel 164 for reconstruction of the data. The preamp/driver 166 is preferably affixed to the actuator assembly 110 within the confines of the HDA 101, as shown in FIG. 1.

A servo circuit 168 uses servo information stored on the discs 106 to provide closed loop head positional control. The servo circuit 168 includes a digital signal processor (DSP) 170 having associated programming to carry out both seeks (movement of the selected head from an initial track to a destination track) and track following operations (controlled positioning of the selected head over a particular track). The disc drive 100 is contemplated as utilizing an embedded servo scheme, so that both user data and servo information are written to each of the disc surfaces, although such a configuration is not limiting to the scope of the claimed invention.

Continuing with FIG. 3, a spindle motor driver circuit 172 operates to apply drive currents to the driver coils 148 to rotate the discs 106. For reference, it will be noted that the spindle motor 104 is characterized as a three-phase inductive motor with the phases connected in a delta-configuration, although the claimed invention is not so limited. During operation, the spindle motor driver circuit 172 generates a velocity error signal $V_{ERR}$ which is supplied to the control processor 158 on path 174.

A spindle velocity sense circuit 176 likewise detects voltages induced in the velocity sense coils 150 and preferably outputs a pair of signals to the control processor 158: an actual velocity signal $V_M$ on path 178 and an actual rotational acceleration signal $A_M$ on path 180, which provide measures of the rotational velocity and acceleration, respectively, of the spindle motor 104.

FIG. 4 provides a functional block diagram of the spindle velocity sense circuit 176 of FIG. 3, in conjunction with the velocity sense coils 150. The circuit of FIG. 3 includes a full wave rectifier 182 and filter 184 which operate to provide an analog voltage generally indicative of the rotational velocity of the spindle motor 104. In this regard, the sense coils 150 and the sense circuit 176 operate as a voltage generator. For a related discussion of the use of spindle driver coils to generate a voltage when power is removed from a disc drive, see U.S. Pat. No. 4,679,102 issued Jul. 7, 1987 to Wevers et al., assigned to the assignee of the present invention.

The output of the filter 184 is digitized by an analog to digital (A/D) converter 186 to provide the $V_M$ signal on path 178. The $V_M$ signal is further differentiated by a differentiator (DIFF) 188 and filtered by a lead/lag filter 190 to produce the $A_M$ signal on path 180. Use of these two signals in accordance with preferred embodiments will be discussed after a brief review of the spindle motor driver circuit 172 of FIG. 3.

Figure 5:
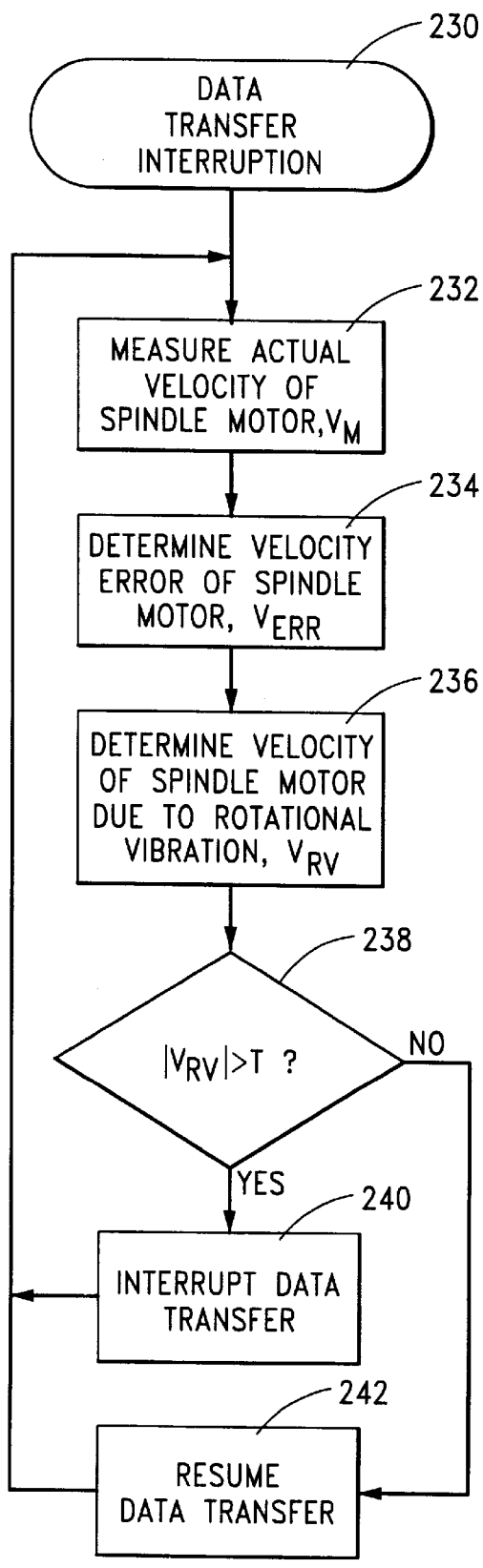
FIG. 5 provides a functional block diagram of the spindle motor driver circuit of FIG. 3.

Referring to FIG. 5, the spindle motor driver circuit 172 operates to provide commutation timing and rotational speed control for the driver coils 148 of the spindle motor 104. As discussed more fully in U.S. Pat. No. 5,631,999 issued May 20, 1997 to Dinsmore, assigned to the assignee of the present invention, commutation involves sequentially energizing the driver coils 148 to induce magnetic fields which interact with the permanent magnets 142 to cause the hub portion 136 to rotate in the desired direction at the desired speed. The circuit of FIG. 5 rotates through a series of commutation steps over each revolution of the spindle motor 104, with the time between successive commutation steps defining a commutation period.

A transconductance amplifier and driver circuit 202 sequentially supplies current to, sinks current from, and holds at a high impedance each of three connection nodes A, B and C of the driver coils 148 at each of the commutation steps in response to commutation timing signals from commutation logic 204. Back electromotive force (emf) sensing is accomplished using a back emf sense circuit 206, which outputs zero crossing (ZX) pulses when the voltage on the node held to high impedance crosses over the voltage at the node sinking the current. The ZX pulse will nominally occur at the mid-point of each commutation period.

Continuing with FIG. 5, the ZX pulses are fed to a commutation pulse generator 208 which generates the necessary timing for the commutation logic circuit 204 to apply the appropriate sequence of inputs to the driver portion of the transconductance amplifier and driver circuit 202. This is preferably implemented in hardware with top level processor control.

The ZX pulses are further provided to a commutation frequency ($F_{COM}$) generator 210, which outputs $F_{COM}$ pulses in response thereto (the $F_{COM}$ pulses can occur at the same time, or can be delayed with respect to, the ZX pulses).

The $F_{COM}$ pulses, as well as a reference frequency $F_{REF}$ from a reference clock 212 are provided to a phase error detector 214, which determines phase error between these two signals. The $F_{REF}$ frequency nominally corresponds to the operational speed of the spindle motor 104; for example, for a three-phase, twelve-pole spindle motor rotating at 7,200 revolutions/minute (120 revs/second), $F_{REF}$ would be:

$F_{REF}$=(no. of phases)(no. of poles)(revs/second)

=(3)(12)(120)=4.32 Hz.     (1)

The phase detector generates pump up and pump down pulses $P_U$ and $P_D$, respectively, based on the relative timing of the $F_{REF}$ and $F_{COM}$ pulses. A $P_U$ pulse is generated when an $F_{COM}$ pulse occurs after the corresponding $F_{REF}$ pulse and has a duration equal to the phase difference between the $F_{COM}$ and $F_{REF}$ pulses. A $P_U$ pulse indicates that the motor is running too slowly. Similarly, a $P_D$ pulse indicates that the motor is running too fast and is generated when an $F_{COM}$ pulse occurs before the corresponding $F_{REF}$ pulse and has a duration equal to the phase difference therebetween.

The $P_U$ and $P_D$ pulses are provided to a charge pump circuit 216 which outputs a $P_{OUT}$ signal having a voltage magnitude determined by the application of the $P_U$ and $P_D$ pulses. In the absence of a $P_U$ and a $P_D$ pulse, $P_{OUT}$ is a reference voltage; $P_{OUT}$ is increased to a first value above the reference voltage for the duration of a $P_U$ pulse and is decreased to a second value below the reference voltage for the duration of a $P_D$ pulse.

The $P_{OUT}$ signal is provided to a compensation filter 218, which includes a low pass filter stage (not separately shown) used to filter out sample frequencies related to the $P_U$ and $P_D$ pulses. A lead-lag filter stage (also not separately shown) receives the output of the low pass filter state and provides desired phase margin to achieve stability of the control loop.

The output of the compensation filter 218 is an analog velocity error signal indicative of the velocity error of the spindle motor 104. The signal is provided to the transconductance amplifier and driver circuit 202 to adjust the amount of current applied to the driver coils 148, as well as to an analog to digital (A/D) converter 220 to generate the digital $V_{ERR}$ signal on path 174.

Referring now to FIG. 6, shown therein is a DATA TRANSFER INTERRUPTION routine 230, which sets forth steps carried out by the disc drive 100 to interrupt the transfer of data when the magnitude of rotational vibration applied to the disc drive is sufficiently severe. The routine of FIG. 6 is representative of programming stored in the control processor memory (MEM) 160 and utilized by the control processor 158. It will be appreciated that the routine of FIG. 6 is a top level routine performed as part of other continuously executing programming steps of the control processor 158 during disc drive operation.

As shown at step 232, the routine first determines the magnitude of the motor velocity signal $V_M$ obtained from the sense coils 150. As discussed above, this value is provided to the control processor 158 by way of the path 178. It will be noted that the $V_M$ signal is indicative of actual relative movement between the sense coils 150 and the permanent magnets 142 (and hence, the relative movement between the discs 106 and the base deck 102); that is, the $V_M$ signal is a composite of both the rotation of the discs 106 caused by the commutation of the driver coils 148, as well as any rotational component induced by the application of rotational vibration to the disc drive.

The velocity error $V_{ERR}$ signal is next determined at step 234 (as provided on path 174 in FIGS. 3 and 5) and the control processor 158 determines the velocity of the spindle motor 104 as a result of the application of rotational vibration, referred to as $V_{RV}$, through an algebraic combination of $V_{ERR}$ and $V_M$ as follows:

$$V_{RV} = V_M - V_{ERR}. \quad (2)$$

The magnitude (absolute value) of the rotational vibration velocity $V_{RV}$ is compared to a predetermined threshold T at decision step 238, with the threshold T preferably being selected to correspond to a level above which the servo circuit 168 cannot adequately reject the applied rotational vibration; that is, the threshold T preferably identifies when a magnitude of the rotational vibration applied to the disc drive 100 exceeds a specified magnitude, such as, for example, 21 radians per second$^2$ (rads/sec$^2$), over a frequency range of interest, such as, for example, from 20 hertz (Hz) to 800 Hz.

At such time that the magnitude exceeds the threshold T, a data transfer operation (such as a read or a write operation) is temporarily interrupted, as indicated by step 240; likewise, step 212 resumes data transfer once the rotational vibration returns to an acceptable level (and represents normal operation of the drive in the absence of applied rotational vibration).

In a further preferred embodiment, the disc drive 100 operates to compensate for the effects of rotational vibration. Referring now to FIG. 7, shown therein is a block diagram representation of such operation of the servo circuit 168. More particularly, the block diagram representation includes modules existing in programming utilized by the DSP in providing positional control while minimizing the effects of rotational vibration upon the drive.

As shown in FIG. 7, a plant block 300 is presented representative of selected electrical and mechanical aspects of the disc drive 100. For reference, the plant 300 generally corresponds to the electromechanical servo loop established by the head 120, the preamp/driver 166, the read/write channel 164, the servo circuit 168, and the actuator coil 113. The plant 300 receives as an input a current command ($I_{CMD}$) signal on path 302 and, in response, outputs a position error signal (PES) on path 304 indicative of positional error in the selected head 120.

FIG. 7 further shows an observer block 306, which generally provides a mathematical model of the plant 300 and periodically outputs estimates of head position ($X_{EST}$), velocity ($V_{EST}$) and bias ($W_{EST}$) on paths 308, 310 and 312, respectively. Bias will be understood as indicative of forces that tend to move the heads away from a selected position, such as spring forces applied by the flex circuit 124 (FIG. 1) and windage effects caused by air currents set up by the rotation of the discs 106. Bias will usually be dependent upon radial position of the head with respect to the disc. The estimates output by the observer 306 are formed in relation to an observer error ($O_{ERR}$) signal on path 314 generated by a summing junction 316 as the difference between the PES and the $X_{EST}$.

The $X_{EST}$ on path 308 is further summed at a summing junction 318 with a reference position (indicative of desired head position) and the output on path 320 is applied to a position gain block 322 having gain $K_X$. The $V_{EST}$ on path 310 is similarly applied to a velocity gain block 324 having gain $K_V$. The outputs of the position and velocity gain blocks 322, 324 are brought to a summing junction 326 by way of paths 328, 330, respectively.

The manner in which the $A_M$ signal is preferably used to control head position (i.e., control the amount of current applied to the coil 113), thereby compensating for the effects of rotational vibration applied to the disc drive 100, will now be discussed. Particularly, FIG. 7 shows the $A_M$ signal being applied to a gain block 330 having a gain $K_A$. It is contemplated that the $A_M$ signal is passed from the control processor 158 to the servo DSP 170 (in accordance with the functional configuration of FIG. 3), although in alternative configurations the $A_M$ signal can be provided directly to the DSP 170. It will be noted that the use of two processors, the control processor 158 and the DSP 170, is merely for purposes of illustrating a preferred embodiment; the claimed invention can be readily practiced in drives incorporating the use of a single processor that carries out both overall drive management and head positional control.

The gain $K_A$ is preferably selected in a manner discussed below, but generally is set to a value that maximizes the ability of the servo circuit 168 to compensate for the effects of rotational vibration on the disc drive 100. The output of the $K_A$ gain block 330 is provided on path 338 and is likewise summed by the summing junction 326.

The output of the summing junction 326 is provided along path 340 to a summing junction 342, which further receives the $W_{EST}$ from the observer 306 on the path 312. The resulting signal, impressed on path 344, is generally proportional to the current to be applied to the coil 113 and is provided to the observer 306 as shown. To maintain the operation of the observer 306 nominally that of the plant 300, however, the signal of path 344 is also passed through a gain block 346 with gain $K_P$ to generate the aforementioned current command signal $I_{CMD}$.

To present a preferred method for setting the gain $K_A$ of the gain block 330 to an optimum value, FIG. 8 has been provided which shows a general flow chart for a GAIN CALIBRATION routine 350, carried out in accordance with a preferred embodiment of the present invention. The routine of FIG. 8 generally corresponds to programming utilized by the DSP 170. It is contemplated that the routine will be carried out during disc drive manufacturing, but can also be subsequently carried out during data processing use of the disc drive 100 (i.e., by an end-user of the drive).

As shown at step 352, the disc drive 100 is first placed and operated within a rich vibrational environment, wherein a broad spectrum of translational and rotational vibrational components is applied to the disc drive 100. Such an environment is shown schematically in FIG. 9.

More particularly, FIG. 9 illustrates an enclosure 354 housing a plurality of hard disc drives (12 in this example, identified as HDD1–HDD12) nominally identical to the disc drive 100 of FIG. 1. The disc drives are mechanically coupled together in such a manner so as to maximize transfer of vibrational components from drive to drive during operation. The enclosure 354 can correspond to an environmental chamber used to perform manufacturing dynamic burn-in (DBI) testing wherein the drives are operated over an extended period of time (such as 48 hours) while being subjected to a variety of environmental conditions, such as different temperatures, ambient pressures, etc. Alternatively, the enclosure 354 can correspond to a RAID housing so that the disc drives form a multi-drive array and are operated as a single data storage system.

A plurality of mechanical vibration sources 356 such as motors ("MOT") can also be coupled to the disc drives, as shown in FIG. 9. These vibration sources 356 inject additional amounts of vibration into the disc drives, and can represent cooling fans used to enhance convective cooling of the drives (such as commonly used in RAID housings); alternatively, when the routine of FIG. 8 is carried out during DBI, the vibration sources 356 can be motors that are specifically placed within the environmental chamber.

Returning to FIG. 8, the routine next proceeds to identify an optimum value for the gain $K_A$ which results in a minimum average PES magnitude; in other words, the optimum gain setting for $K_A$ minimizes the effects of vibration on head position, as reflected by PES magnitude. This is preferably accomplished by first setting the gain $K_A$ to an initial value, as indicated by step 358, measuring the average PES, step 360, and repeating for each new increment of $K_A$, as indicated by decision step 362 and step 364. Steps 358, 360, 362 and 364 accordingly comprise a sweep of the gain $K_A$ from its minimum to maximum value while measuring the average PES for each increment, using an accumulation function or other suitable methodology to capture the average PES in each case. The optimum value of $K_A$ is next selected at step 366 in relation to the value that provided the minimum average PES, and this optimum value is thereafter used by the gain block 330 (FIG. 7) until the next execution of the routine of FIG. 8. Once the optimum value is selected, the routine ends at step 368.

The routine of FIG. 8 thus presents an efficient methodology for determining the optimum value for the gain $K_A$ and possesses several additional advantages over the prior art. For example, unlike some conventional prior art approaches, it is unnecessary to place the disc drive 100 onto a shaker table in order to apply carefully controlled amounts of vibration to the drive; instead, the routine can be carried out during existing conventionally applied manufacturing steps (such as DBI) with little or no modification to the test routine. The rich vibrational environment used to calibrate the gains during manufacturing (i.e., multi-drive DBI chamber) will often be representative of the actual operational environment in which the drive will ultimately be operated, ensuring better correlation with actual field use.

Moreover, the adaptive capabilities of the routine of FIG. 8 allow the disc drive 100 to further optimize the gain $K_A$ in relation to the vibrations experienced in each particular operational environment. For example, it is contemplated that the routine of FIG. 8 can be performed by the disc drive during field use on a periodic basis to maintain optimal performance of the drive. The routine can also be specifically performed by the drive after the occurrence of a sufficient number of off-track faults, in an effort to better optimize present settings of the drive.

Having completed the foregoing discussion of the manner in which the gain $K_A$ is preferably selected to minimize the effects of rotational vibration, reference is now made to FIG. 10 which sets forth a generalized flow chart for a ROTATIONAL VIBRATION COMPENSATION routine 400, carried out in accordance with a preferred embodiment during operation of the disc drive 100. The routine of FIG. 10 is preferably performed in conjunction with other top level disc drive operational routines.

As the driver coils 148 magnetically interact with the permanent magnets 142 to rotate the spindle motor 104, the voltages induced by the passage of the permanent magnets 142 proximate the spindle velocity coils 150 undergo full-wave rectification and filtering by the respective circuits 182 and 184 of FIG. 4, as indicated by step 402. A/D conversion is next applied by the A/D converter 186, step 404, thus generating the measured spindle velocity signal $V_M$ discussed above. The $V_M$ signal is differentiated and filtered by the circuits 188, 190 of FIG. 4, as shown by steps 406 and 408 in FIG. 10, to generate the aforementioned measured acceleration signal $A_M$. It will be noted that during normal operation of the disc drive 100, in the general absence of rotational vibration (and negligible amounts of spindle motor speed variation), the $A_M$ signal will be nominally zero, and accordingly have a nominal effect upon the operation of the servo circuit 168.

The gain $K_A$ is next applied to the $A_M$ signal, step 410 of FIG. 10, as carried out by the gain block 330 of FIG. 7. The resulting product $(A_M)(K_A)$ is then fedforward into the servo loop (step 412 of FIG. 10, at the summing junction 326 of FIG. 7), to minimize the effects of rotational vibration upon the disc drive 100. The routine of FIG. 10 loops back as shown, thereby continuing in like manner during continued operation of the drive.

In view of the foregoing discussion, it will now be clear that the present invention is directed to a method and apparatus for detecting and compensating for the effects of rotational vibration on a disc drive. As exemplified by preferred embodiments, a disc drive spindle motor 104 controllably rotates a data storage disc 106 using a set of driver coils 148 which magnetically interact with a plurality of circumferentially extending driver magnets 142 when electrical currents are applied to the driver coils. A separate set of sense coils 150 output a set of voltages indicative of rotational velocity of the disc to detect the application of rotational vibration to the disc drive. The sense coils preferably magnetically interact with the driver magnets, although separate sense magnets can be alternatively provided.

A spindle motor driver circuit 172 applies the electrical currents to the set of driver coils and outputs a velocity error signal $V_{ERR}$ indicative of error in rotational velocity of the disc, with the spindle motor driver circuit adjusting the electrical currents in relation to the velocity error signal. A spindle velocity sense circuit 176 generates a motor velocity signal $V_M$ indicative of the velocity of the spindle motor in response to the set of voltages output by the set of sense coils. A processor 158 having associated programming detects the application of rotational vibration to the disc drive in relation to the velocity error signal $V_{ERR}$ and the motor velocity signal $V_M$.

The disc drive further preferably comprises an actuator 110 supporting a head 120 adjacent the disc, the actuator having a coil 113 of an actuator motor 114. A servo circuit 168 applies current to the coil to position the head relative to the disc, wherein the servo circuit compensates for the application of rotational vibration to the disc drive by adjusting the current applied to the coil in relation to the motor velocity signal.

For purposes of the appended claims, the terms "circuit" will be understood to be realizable in either hardware or software, in accordance with the foregoing discussion. Although method steps have been set forth in a particular order, such ordering is not necessarily limiting to the scope of the claims.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for detecting application of rotational vibration to a disc drive having a spindle motor with a driver coil and a driver magnet, the spindle motor rotating a data storage disc through controlled application of current to the driver coil to establish a magnetic field which interacts with a magnetic field generated by the permanent magnet, the method comprising steps of:

(a) immersing a velocity sense coil in a magnetic field generated by a permanent magnet of the spindle motor;

(b) generating a motor velocity signal indicative of a rotational velocity of the disc in relation to a voltage induced across the velocity sense coil by relative movement between the velocity sense coil and the magnetic field of the immersing step (a); and (c) detecting application of rotational vibration to the disc drive in relation to the motor velocity signal.

2. The method of claim 1, further comprising a step of:

(d) interrupting a data transfer operation between the disc and a host device when a magnitude of the rotational vibration applied to the disc drive exceeds an acceptable level.

3. The method of claim 2, wherein the disc drive further has a head controllably positionable adjacent a surface of the disc through application of current to an actuator coil, and wherein the method further comprises a step of:

(e) controlling the application of current to the actuator coil in relation to the motor velocity signal.

4. The method of claim 2, wherein the detecting step (c) further comprises steps of:

(c1) obtaining a velocity error signal indicative of error in rotational velocity of the disc, wherein a magnitude of the current applied to the driver coil is adjusted in relation to the velocity error signal; and (b2) determining a rotational vibration velocity signal in relation to the velocity error signal and the motor velocity signal, the rotational vibration velocity signal indicative of rotational velocity imparted to the disc by the application of rotational vibration to the disc drive.

5. The method of claim 4, wherein the interrupting step (d) further comprises steps of:

(d1) comparing a magnitude of the rotational vibration velocity signal to a predetermined threshold; and (d2) interrupting the data transfer operation when the magnitude of the rotational vibration velocity signal exceeds the predetermined threshold.

6. The method of claim 1, wherein the sense coil is disposed proximate the driver coil, and wherein the permanent magnet of the immersing step (a) comprises the driver magnet so that both the driver coil and the sense coil are immersed in the magnetic field generated by the driver magnet.

7. The method of claim 1, wherein the driver coil is one of a set of driver coils to which currents are applied to rotate the disc, and wherein the sense coil is one of a set of separate sense coils which output voltage signals which are rectified to generate the motor velocity signal.

8. A spindle motor operably configured to rotate a disc in a disc drive, comprising:

a plurality of circumferentially extending driver magnets;

a set of driver coils which rotate the disc when electrical currents are applied to the driver coils, wherein the electrical currents establish magnetic fields which interact with magnetic fields established by the driver magnets; and a separate set of sense coils which output a set of voltages indicative of rotational velocity of the disc to detect application of rotational vibration to the disc drive.

9. The spindle motor of claim 8, wherein the sense coils are disposed proximate the driver coils and immersed in the magnetic fields established by the driver magnets.

10. The spindle motor of claim 8, further comprising a plurality of circumferentially extending sense magnets separated from the driver magnets, wherein the sense coils are immersed in magnetic fields established by the sense magnets.

11. A disc drive, comprising:

a spindle motor which controllably rotates a data storage disc and comprises:

a plurality of circumferentially extending driver magnets;

a set of driver coils which rotate the disc when electrical currents are applied to the driver coils, wherein the electrical currents establish magnetic fields which interact with magnetic fields established by the driver magnets; and a separate set of sense coils which output a set of voltages indicative of rotational velocity of the disc;

a spindle motor driver circuit which applies the electrical currents to the set of driver coils and outputs a velocity error signal indicative of error in rotational velocity of the disc, wherein the spindle motor driver circuit adjusts the electrical currents in relation to the velocity error signal;

a spindle velocity sense circuit which generates a motor velocity signal indicative of the velocity of the spindle motor in response to the set of voltages output by the set of sense coils; and a processor having associated programming to detect application of rotational vibration to the disc drive in relation to the velocity error signal and the motor velocity signal.

12. The disc drive of claim 11, wherein the processor obtains a rotational vibration velocity signal in relation to a difference between the velocity error signal and the motor velocity signal, and wherein the processor interrupts transfer of data between the disc and a host device when a magnitude of the rotational vibration velocity signal exceeds a predetermined threshold.

13. The disc drive of claim 11, further comprising:

an actuator comprising a head supported adjacent the disc and a coil of an actuator motor; and a servo circuit, operably coupled to the head and the actuator motor, which applies current to the coil to position the head relative to the disc, wherein the servo circuit compensates for the application of rotational vibration to the disc drive by adjusting the current applied to the coil in relation to the motor velocity signal.

14. The disc drive of claim 11, wherein the spindle velocity sense circuit rectifies the set of voltages output by the set of sense coils to generate the motor velocity signal.

* * * * *